US006612434B1

(12) United States Patent
Redzisz

(10) Patent No.: US 6,612,434 B1
(45) Date of Patent: Sep. 2, 2003

(54) SPORT TACKLE BOX BAG

(75) Inventor: Andrezj Redzisz, Wheeling, IL (US)

(73) Assignee: Travel Caddy, Inc., Des Plaines, IL (US)

( * ) Notice: Subject to any disclaimer, the term of this patent is extended or adjusted under 35 U.S.C. 154(b) by 0 days.

(21) Appl. No.: 09/977,021

(22) Filed: Oct. 12, 2001

Related U.S. Application Data
(60) Provisional application No. 60/240,283, filed on Oct. 13, 2000.

(51) Int. Cl.[7] .................................................. B65D 85/00
(52) U.S. Cl. .................................. 206/315.11; 190/109
(58) Field of Search ........................ 206/315.1, 315.11; 190/109, 111–113, 124, 125

(56) References Cited

U.S. PATENT DOCUMENTS

| | | | | |
|---|---|---|---|---|
| 2,560,335 A | * | 7/1951 | Ericson | 190/112 |
| 3,759,356 A | * | 9/1973 | Bostick et al. | 190/111 |
| 4,762,210 A | * | 8/1988 | Boitani | 190/111 |
| 5,497,919 A | * | 3/1996 | Klinger | 190/109 |
| 5,873,504 A | * | 2/1999 | Farmer | 190/111 |

* cited by examiner

Primary Examiner—Luan K. Bui
(74) Attorney, Agent, or Firm—Banner & Witcoff, Ltd.

(57) ABSTRACT

A sport tackle box bag for carrying multiple rectangular parallelepiped generally rigid tackle storage boxes includes a lower section having a front flap for access to the lower section and an upper section having a top flap for access to the top section.

3 Claims, 1 Drawing Sheet

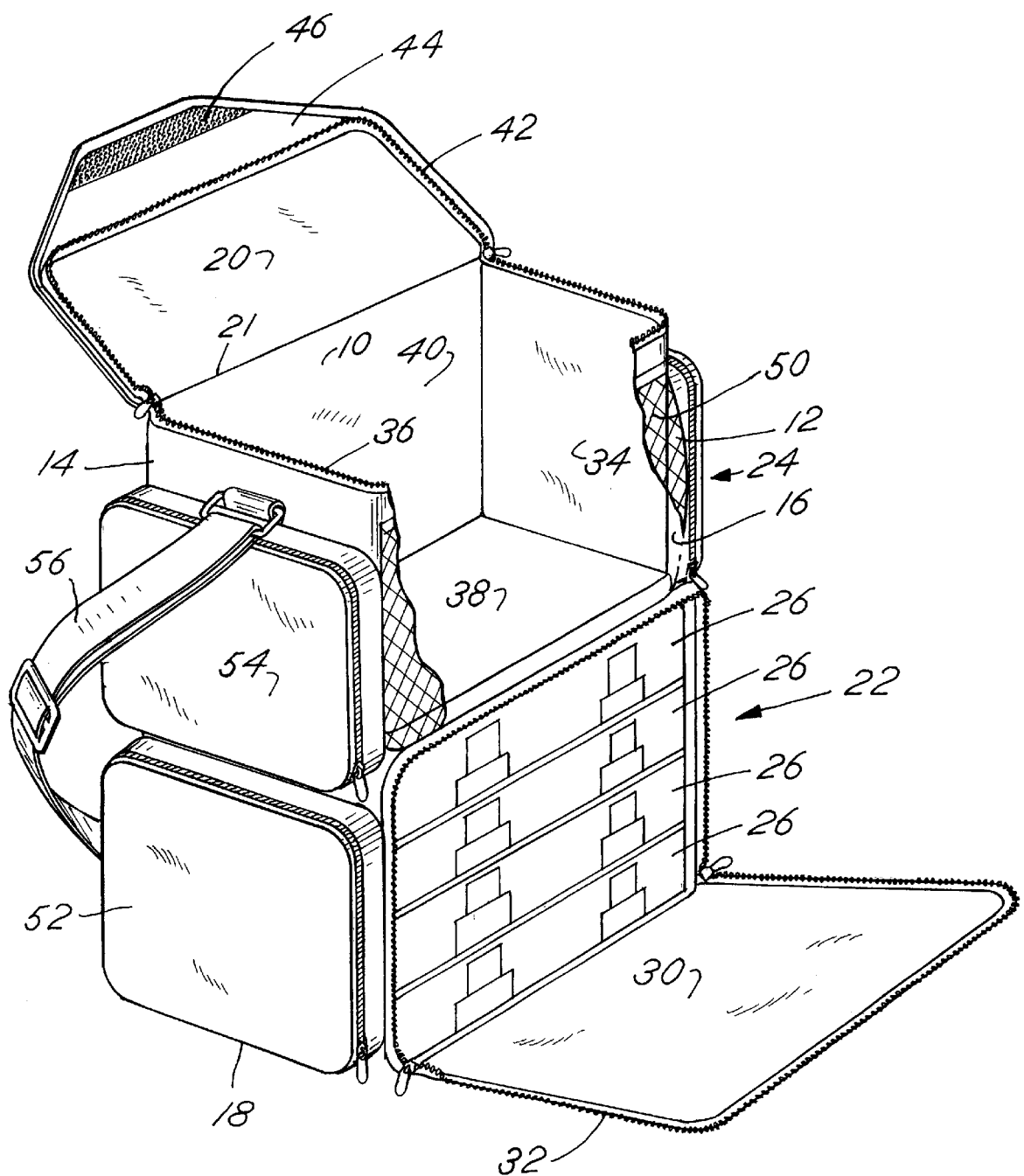

SPORT TACKLE BOX BAG

CROSS REFERENCE TO RELATED APPLICATION

This is a utility application based upon U.S. Provisional Application Ser. No. 60/240,283 filed Oct. 13, 2000 entitled "Sport Tackle Box Bag" which is incorporated herewith by reference and for which priority is claimed.

BACKGROUND OF THE INVENTION

In a principal aspect the present invention relates to a soft-sided sport tackle box bag capable of holding and transporting multiple rigid molded modular tackle boxes.

Sportsmen, such as fishermen, often categorize their various sports items and store them in modular size plastic boxes. When traveling to a sight to fish or engage in some other sport, it is desirable, if not necessary, to transport a wide variety of items useful in the practice of the sport such as fishing. One type of container which is used for such a purpose is a fishing creel. However, the design of most fishing creels or transport container or bags does not lend itself to ease of utilization of molded plastic tackle boxes. Further, the capacity for such creels is usually limited. Thus, there has developed a need for an improved sport tackle box bag.

SUMMARY OF THE INVENTION

Briefly, the present invention is a sport tackle box bag which is comprised of a parallelepiped soft-sided luggage type item divided into two compartments or sections. A lower compartment or section has a front access panel which permits access to a stack of sport tackle boxes in the lower compartment. An upper compartment is formed by means of a flexible bag within a bag, again sized in a modular manner to receive and hold a multiple number of stacked tackle boxes. The top flap permits access to the upper compartment. Pouches may be provided on the sides of the bag and carry straps provided for transport of the bag.

Thus, it is an object of the invention to provide an improved sport tackle box bag having two basic compartments, namely, a lower compartment for receipt of a number of modular tackle boxes and an upper compartment accessible from the top of the bag which is also designed to receive a number of modular tackle boxes.

Another object of the invention is to provide an inexpensive, yet rugged and highly utilitarian sport tackle box bag.

A further object of the invention is to provide a sport tackle box bag which provides ease of access to the top of the bag as well as the front of the bag while the bag is being transported on the shoulder of a sportsman, for example, who desires to have access to the contents of the bag from the top or front side.

Yet another object of the invention is to provide a sport tackle box bag which is manufactured from flexible fabric such as canvas, vinyl, leather or a cloth material.

Another object of the invention is to provide an inexpensive, yet highly rugged and durable tackle box bag. These and other objects, advantages and features of the invention will be set forth in the detailed description which follows.

BRIEF DESCRIPTION OF THE DRAWING

The drawing comprises a single figure of an isometric view of the sport tackle box bag of the invention.

DESCRIPTION OF THE PREFERRED EMBODIMENT

The sport tackle box bag of the invention is designed to receive a series of tackle boxes, each tackle box having a generally identical size and shape or comprising a modular variation thereof. Typically, such tackle boxes are formed of clear plastic material and have a rectangular parallelepiped shape. The boxes have compartments therein or may, alternatively, have sliding drawers for holding and storing tackle box items such as bait sinkers, leaders, flys, line and lures. A sport tackle box, however, is not limited to use by fishermen. Hobbyists and other sportsmen may also use such boxes along with a bag as described below to carry materials associated with their hobby or sport.

The sport tackle box bag of the invention includes a back side 10, a front side 12, a first lateral side 14 and a second opposite lateral side 16, as well as a bottom side 18 and a top closure flap 20. The described sides and top define a parallelepiped enclosure which is constructed of flexible material such as canvas, vinyl or the like. The material is sewn to provide the described configuration and the compartments therein have a modular size to receive multiple, modular sized tackle boxes.

The bag includes a first or lower section 22 and a second or upper section 24. With respect to the lower section 22, it is sized to enclose and house a modular number of tackle boxes 26. The tackle boxes 26 are typically molded plastic containers and arrayed one on top of the other within the lower section 22 of the bag. The lower section 22 thus includes the bottom side 18 and a portion of the first lateral side 14 and the second lateral side 16 as well as a portion of the back side 10. The lower section 22 is in the form of a rectangular parallelepiped. A front flap 30 which is hinged to the bottom section or bottom side 18 permits access to the lower section 22. The front flap 30 is attached to and defines part of the front side 12 by means of a zipper 32.

The upper section 24 of the tackle box bag is comprised of sides which define a bag within a bag. That is, the upper section 24 includes separate side wall elements 34 and 36, as well as a bottom interior wall section 38. A separate back side wall section 40 may be included or the back wall 10 may be utilized in combination with the independent panel sections 34, 36 and 38. In any event, a parallelepiped, open top enclosure is formed to define the upper section 24. The flap 20 attached to the back wall 10 through a hinge connection 21 folds over the open top and may be attached thereto by a zipper 42. A fastening flap or tab 44 which includes a fastening strip 46 may also be provided to fold over and attach to the front side 12. For example, a Velcro fastener may be utilized.

The front side 12 may include a woven mesh pocket 50 as an option. Side pockets 52 and 54 may be attached to lateral side 14, for example. A backpack strap 56 may be attached to a side wall 14 or to back wall 10 at the bottom and top of the back wall 10. Only one side support strap 56 is depicted. However, two straps 56 may be utilized in order to act as shoulder straps for carrying the sport tackle box bag. Tackle boxes, such as boxes 26 which are modular in shape, may be stacked within the upper section 24. In this manner, access to the boxes 26 in the upper section 24 or the lower section 22 are individually accessible. Typically, the panel sections or sides 40, 34, 36 and 38 are separately sewn and distinct from the back wall 10, as well as the side walls 14, 16 and front wall 12 so that the upper section 24 provides an open topped bag for receipt of tackle boxes 26 or other items. However, the upper section 24 may be formed in a manner which enables it to incorporate back wall 10 and thus folding of the sides 34, 36, 38 toward the front wall 12 for access from the top of the bag to the tackle boxes 26 shown as depicted in the lower section 22.

In view of the foregoing description, various alternative embodiments may be utilized. For example, the upper section of the tackle box bag may be subdivided without departing from the spirit and scope of the invention. Similarly, the lower section of the bag may also be compartmentalized and the lower flap 30 may be divided into multiple flaps. Thus, the invention is to be limited only by the following claims and equivalents.

What is claimed is:

1. A sport tackle box bag for carrying multiple, rectangular parallelepiped generally rigid tackle storage boxes, comprising, in combination:

a first, soft sided, rectangular parallelepiped bag having a back side, first and second lateral sides, a front side, a bottom side, and a top side, the front side including a lower section compartment and an upper section compartment, the lower section compartment comprising a hinged front panel flap attached to the bottom side and comprising a lower part of the front side, said front panel flap foldable for access to said lower section compartment in the interior of the bag, the remainder of the interior of the bag defining said upper section compartment; said top side defining a hinged flap attached to the back side for access to the interior of said upper section compartment, said upper section compartment, having a back side, first and second lateral sides, a front side and a bottom side formed as a rectangular parallelepiped accessible only from the top of the bag thereby defining said upper section compartment, said lower section compartment defining a separate compartment for tackle boxes, and at least one compartment including a plurality of rigid, modular tackle boxes filling in said compartment to maintain the shape and configuration of said compartment.

2. The bag of claim 1 wherein the back side includes shoulder straps for carrying the bag.

3. The bag of claim 1 wherein a plurality of rigid tackle boxes are provided in each compartment.

* * * * *